(12) United States Patent
Dong et al.

(10) Patent No.: US 10,516,484 B2
(45) Date of Patent: *Dec. 24, 2019

(54) OPTICAL MODULE

(71) Applicants: HISENSE BROADBAND MULTIMEDIA TECHNOLOGIES CO., LTD, Qingdao (CN); HISENSE BROADBAND MULTIMEDIA TECHNOLOGIES, LTD., Road Town (VG)

(72) Inventors: Yaqian Dong, Qingdao (CN); Long Zheng, Qingdao (CN); Hua Zhang, Qingdao (CN)

(73) Assignees: HISENSE BROADBAND MULTIMEDIA TECHNOLOGIES CO., LTD., Shandong (CN); HISENSE BROADBAND MULTIMEDIA TECHNOLOGIES, LTD., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 16/104,853

(22) Filed: Aug. 17, 2018

(65) Prior Publication Data

US 2018/0367217 A1 Dec. 20, 2018

Related U.S. Application Data

(62) Division of application No. 15/294,572, filed on Oct. 14, 2016, now Pat. No. 10,097,272.

(30) Foreign Application Priority Data

Mar. 28, 2016 (CN) .......................... 2016 1 0184340

(51) Int. Cl.
*H04B 10/40* (2013.01)
*H04B 10/50* (2013.01)
(Continued)

(52) U.S. Cl.
CPC ............... *H04B 10/40* (2013.01); *G02B 6/00* (2013.01); *H04B 10/503* (2013.01); *H04B 10/60* (2013.01)

(58) Field of Classification Search
CPC ....... H04B 10/40; H04B 10/503; H04B 10/60
See application file for complete search history.

(56) References Cited

U.S. PATENT DOCUMENTS 6,694,074 B2 * 2/2004 Schunk ................ G02B 6/4246
385/33
6,856,769 B1 * 2/2005 Steffensen ........... G02B 6/4246
385/94
(Continued)

FOREIGN PATENT DOCUMENTS

CN 1 850 384 A2 10/2007
CN 201576117 U 9/2010
(Continued)

OTHER PUBLICATIONS

"OPA380/OPA2380—Precision, High-Speed Transimpedance Amplifier", Texas Instruments Inc., 2007.*
(Continued)

*Primary Examiner* — Shi K Li
(74) *Attorney, Agent, or Firm* — J.C. Patents (57) ABSTRACT

Some embodiments of the present application provide an optical module, including: a master control chip and a laser receiver; the laser receiver being connected to the master control chip; where the laser receiver includes: a PIN photodiode, a trans-impedance amplifier, a lens, and a shell; the PIN photodiode being electrically connected to the trans-impedance amplifier; and the lens being coated with an antireflection film; where the optical module further includes
(Continued)

a bracket and a claw, where the laser receiver is fixed between a housing of the optical module and the bracket by the claw.

18 Claims, 5 Drawing Sheets

(51) Int. Cl.
 *H04B 10/60* (2013.01)
 *G02B 6/00* (2006.01)

(56) References Cited

U.S. PATENT DOCUMENTS

| | | | | |
|---|---|---|---|---|
| 10,097,272 | B2* | 10/2018 | Dong | H04B 10/40 |
| 2003/0063424 | A1* | 4/2003 | Inujima | G02B 6/4246 |
| | | | | 361/115 |
| 2015/0086211 | A1* | 3/2015 | Coffey | H04B 10/40 |
| | | | | 398/116 |
| 2016/0261341 | A1* | 9/2016 | Ma | H04B 10/40 |
| 2016/0282918 | A1* | 9/2016 | Low | G06F 1/263 |

FOREIGN PATENT DOCUMENTS

| | | |
|---|---|---|
| CN | 102843190 A | 12/2012 |
| CN | 203039695 U | 7/2013 |
| CN | 103684615 A | 3/2014 |
| CN | 203691410 U | 7/2014 |

OTHER PUBLICATIONS

The Chinese First Examination Report of corresponding China Patent Application No. 201610184340.3, dated Oct. 25, 2017.

* cited by examiner

OPTICAL MODULE

CROSS-REFERENCE TO RELATED APPLICATIONS

This application is a divisional application of U.S. patent application Ser. No. 15/294,572, filed on Oct. 14, 2016, which claims priority to Chinese Patent Application No. 201610184340.3, filed on Mar. 28, 2016. All of the aforementioned patent applications are hereby incorporated by reference in their entireties.

TECHNICAL FIELD

The present application relates to optical communication technologies and, in particular, to an optical module.

BACKGROUND

With rapid development of the Internet, demands for network resources are growing rapidly, leading to ever increasing fiber to the home (FTTH) deployment scale. As a core part of optical fiber communication systems, optical modules are globally demanded in huge volume, which makes cost control of optical modules particularly important in the process of developing and manufacturing the optical modules.

SUMMARY

Some embodiments of the present application provide an optical module, including: a master control chip and a laser receiver; the laser receiver being connected to the master control chip; where the laser receiver includes: a PIN photodiode, a trans-impedance amplifier, a lens and a shell; the PIN photodiode being electrically connected to the trans-impedance amplifier; and the lens being coated with an antireflection film; where the optical module further includes a bracket and a claw, where the laser receiver is fixed between a housing of the optical module and the bracket by the claw.

Some other embodiments of the present application provide an optical module, including: a master control chip and a laser receiver, the laser receiver being connected to the master control chip, wherein the laser receiver includes: a PIN photodiode, a trans-impedance amplifier, a lens and a shell, the PIN photodiode being electrically connected to the trans-impedance amplifier, and the lens being coated with an antireflection film; where the optical module further includes a pin assembly and a bracket, where one end of the pin assembly is electrically connected to the laser receiver and the other end is provided passing through the bracket.

DESCRIPTION OF REFERENCE SIGNS

10-Master control chip;
20-Laser transmitter;
30-Laser receiver;
31-PIN photodiode;
32-TIA;
33-Lens;
33-Antireflection film;
34-Shell;
 1-BOSA;
 2-Housing;
 3-Conductive gasket;
 4-PCB;
 5-Pin assembly;
 6-BracketBracket;
 7-Claw;
 8-Tail plug;
101-Laser driver;
102-Receipt signal limiting amplifier;
103-Microcontroller;
104-Internal storage device;
104'-External storage device;
 90-ROSA;
 91-TOSA.

DESCRIPTION OF EMBODIMENTS

In order to make purposes, technical solutions and advantages of the present application clearer, the technical solutions in embodiments of the present application will be described with reference to the accompanying drawings. Obviously, the described embodiments are only part of the embodiments of the present application, rather than all of them. According to the embodiments of the present application, all of the other embodiments obtained by those of ordinary skill in the art without creative effort should fall within the protection scope of the present application.

An optical module provided in some embodiments of the present application may be applied to an optical network unit (ONU) in a gigabit capable passive optical network (GPON) to achieve high data rate transmission over long distance. Of course, the optical module may also be applied to an ONU in other passive optical networks (PON), such as Ethernet passive optical network (EPON), for transmitting signals through optical fibers.

Figure 1:
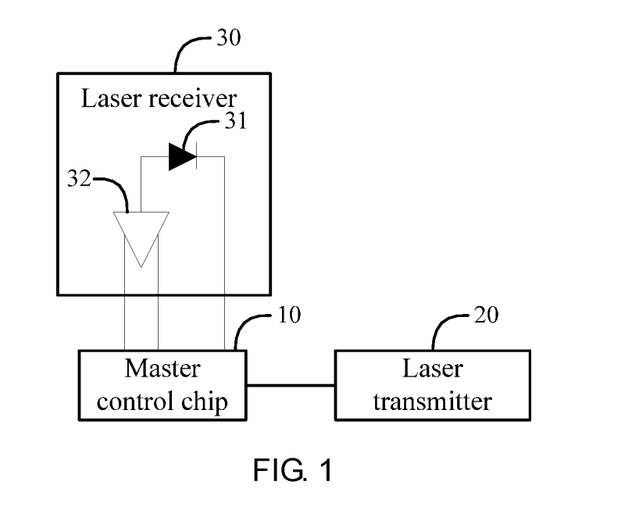
FIG. 1 is a schematic diagram illustrating a circuit structure of an optical module according to some embodiments of the present application.
Figure 2:
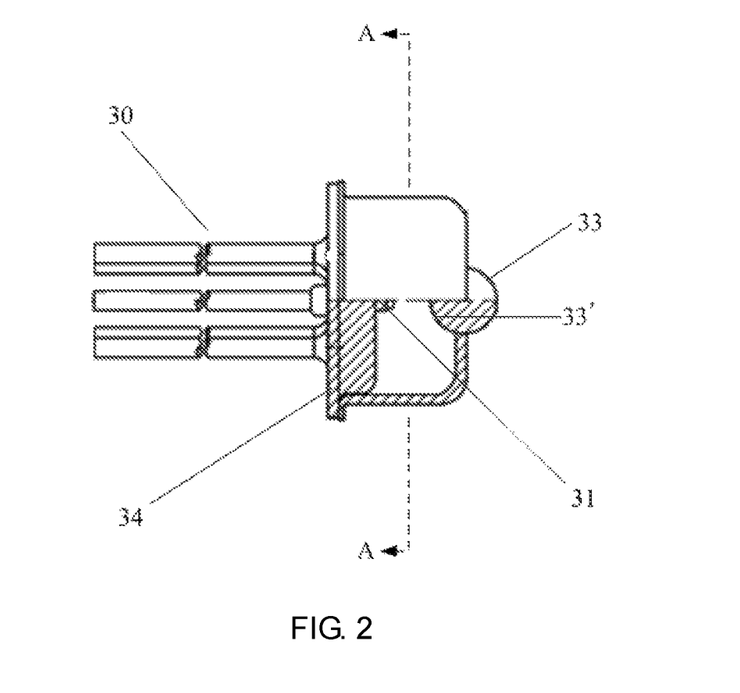
FIG. 2 is a schematic structural diagram of a laser receiver of FIG. 1.
Figure 3:
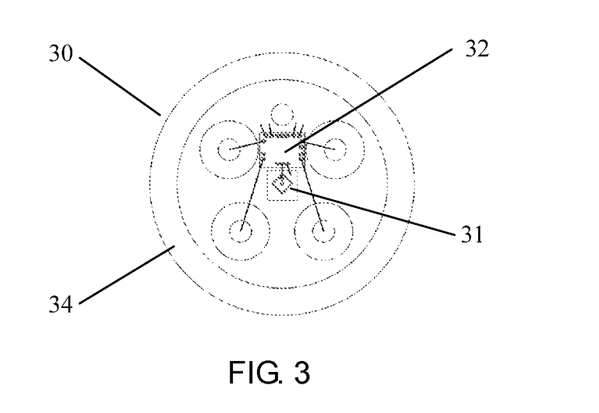
FIG. 3 is a sectional view of the laser receiver of FIG. 2 taken along line A-A.

FIG. 1 is a schematic diagram illustrating a circuit structure of an optical module according to some embodiments of the present application, FIG. 2 is a schematic structural diagram of a laser receiver of FIG. 1, and FIG. 3 is a sectional view of the laser receiver of FIG. 2 taken along line A-A. As shown in FIGS. 1-3, an optical module provided in some embodiments of the present application includes a master control chip 10, a laser transmitter 20 and a laser receiver 30, the laser transmitter 20 and the laser receiver 30 being connected to the master control chip 10, respectively;

where the laser receiver 30 includes a PIN photodiode 31, a trans-impedance amplifier (TIA) 32 with a transimpedance of no less than 43K ohms, a lens 33 and a shell 34; the PIN photodiode 31 being electrically connected to the TIA 32; the PIN photodiode 31, the TIA 32 and the lens 33 being encapsulated within the shell 34 in a manner of transistor out-line; and the lens 33 being coated with an antireflection film 33'.

Figure 7:
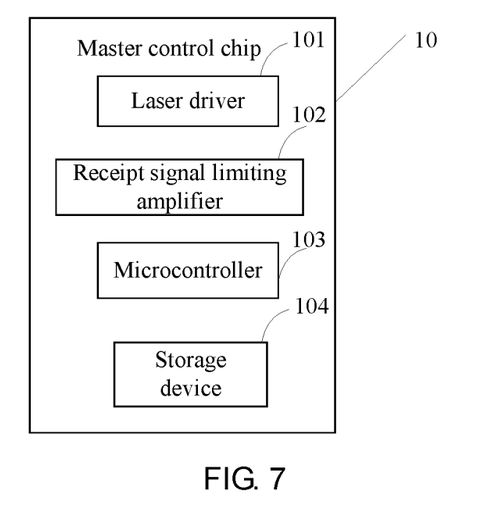
FIG. 7 is a schematic structural diagram of a master control chip according to some embodiments of the present application.
Figure 8:
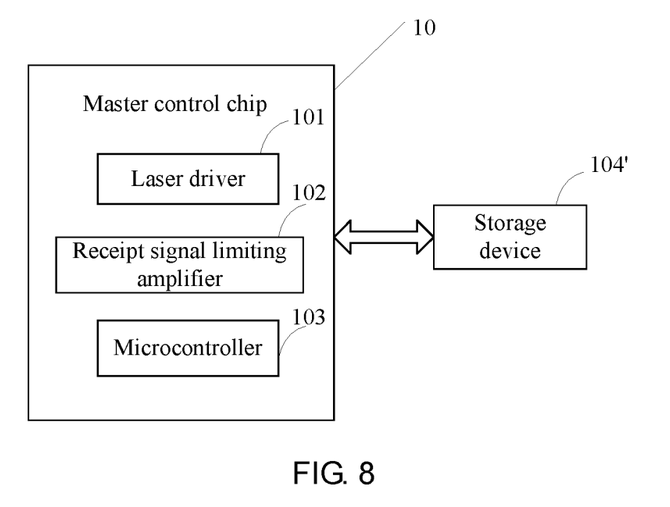
FIG. 8 is a schematic structural diagram of a master control chip according to some other embodiments of the present application.

The master control chip 10 may be a highly integrated three-in-one chip in which a laser driver 101, a receipt signal limiting amplifier 102 and a microcontroller 103 are integrated. A storage device 104 of small capacity may be integrated in the master control chip 10, as shown in FIG. 7; or the master control chip 10 may be connected to an external storage device 104', such as an electrically erasable programmable read-only memory (EEPROM), through a bus, as shown in FIG. 8. The laser transmitter 20 may convert an electrical signal from the master control chip 10 into an optical signal to be transmitted through an optical fiber. The laser receiver 30 may convert an optical signal from the optical fiber into an electrical signal to be transmitted to the master control chip 10.

Figure 9:
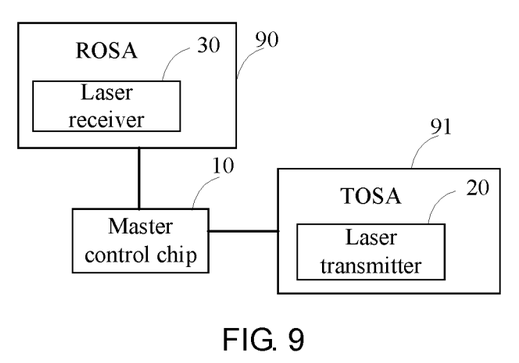
FIG. 9 is a schematic structural diagram of an optical module according to some embodiments of the present application.

The laser transmitter 20 and the laser receiver 30 may be encapsulated in a transmitter optical subassembly (TOSA) 91 and a receiver optical subassembly (ROSA) 90, respectively, as shown in FIG. 9. Alternatively, the laser transmitter 20 and the laser receiver 30 may be encapsulated together in a bi-directional optical sub-assembly (BOSA). To facilitate description, some embodiments of the present application will now be explained by taking a BOSA as an example.

The laser transmitter 20 may be configured to automatically control its optical power and extinction ratio by using closed-loop design of optical power, dual closed-loop design of optical power and extinction ratio, or open-loop design. In the closed-loop design of optical power, a backlight diode and a laser diode (LD) are integrated in the laser transmitter 20, and the master control chip 10 automatically controls the power according to a bias current collected from the backlight diode, so as to prevent unstable optical power caused by slope efficiency changes of the LD as the temperature changes. Meanwhile, a first lookup table (containing the correlation between a modulation current and the temperature) is pre-generated based on characteristics of the LD and stored in a storage device, and the table is queried according to the temperature, so that the extinction ratio is maintained stable under different temperatures. In the dual closed-loop design of optical power and extinction ratio, the master control chip 10 provides automatic compensation according to changes of a bias current collected from the backlight diode and a modulation current collected from the LD, so that both the optical power and the extinction ratio are kept stable. In the open-loop design, then instead of including a backlight diode in the laser transmitter 20, a second lookup table (containing the correlation between the bias current and the temperature) needs to be pre-generated based on characteristics of the laser transmitter 20 and stored in a storage device, and the table is queried according to the temperature, so that both the optical power and the extinction ratio are maintained stable under different temperatures.

The master control chip 10 may implement direct control over the laser driver 101 through an internal register, so as to achieve fast control response. The register may timely control and change the laser driver according to different conditions of a continuously tracked ONU temperature, a supply voltage, a laser bias current and a modulation current, so as to ensure reliable operation of the optical module. To monitor received optical power, the master control chip 10 samples a monitored current output from the laser receiver 30, so that digital diagnosis may be enabled on the optical module. Additionally, a temperature sensor and an internal analog-to-digital converter (ADC) may be integrated in the master control chip 10 to convert collected data, so that the temperature and voltage can be monitored.

In the laser receiver 30, the bandwidth of the PIN photodiode 31 may be 2.5G 10G or the like, and preferably 10G in this embodiment for ensuring sufficient bandwidth. The trans-impedance amplifier 32 is a high gain TIA with a transimpedance of no less than 43K ohms, e.g. a TIA 32 with a transimpedance of 51K ohms for ensuring better gain effect.

The PIN photodiode 31, the TIA 32 and the lens 33 of the laser receiver 30 are encapsulated within the shell 34 in a manner of transistor out-line (TO), where the lens 33 may be hemispherical. For different receipt wavelengths, an antireflection film for a corresponding wave band may be coated on the lens 102, so as to reduce reflection of the received light, increase transmitted light, and hence increase sensitivity. For example, the antireflection film has a transmittance of more than 98%.

The high gain TIA 32 with a transimpedance of no less than 43K ohms can sufficiently amplify a weak electrical signal converted by the PIN photodiode 31, which increases the sensitivity of the laser receiver 30, thereby meeting the requirement of GPONs for long distances. That is, in some embodiments of the present application, the PIN photodiode 31 combined with a super TIA may be used to provide transmission with high sensitivity and long distance in the GPONs.

According to some embodiments of the present application, an optical module includes: a master control chip, a laser transmitter and a laser receiver, the laser transmitter and the laser receiver being connected to the master control chip, respectively, where the laser receiver is embodied as a PIN photodiode combined with a high gain trans-impedance amplifier of no less than 43K ohms transimpedance. The optical module can provide transmission with high sensitivity and long distance in the GPONs while effectively lowering the cost. Additionally, an antireflection film is coated on a lens of the laser receiver to reduce reflection of received light, increase transmitted light, thereby further increasing sensitivity.

Figure 4:
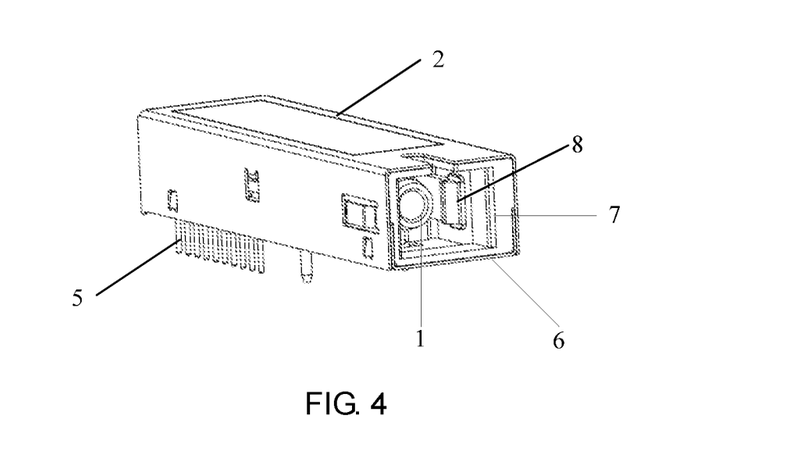
FIG. 4 is a perspective view illustrating an optical module according to some embodiments of the present application.
Figure 5:
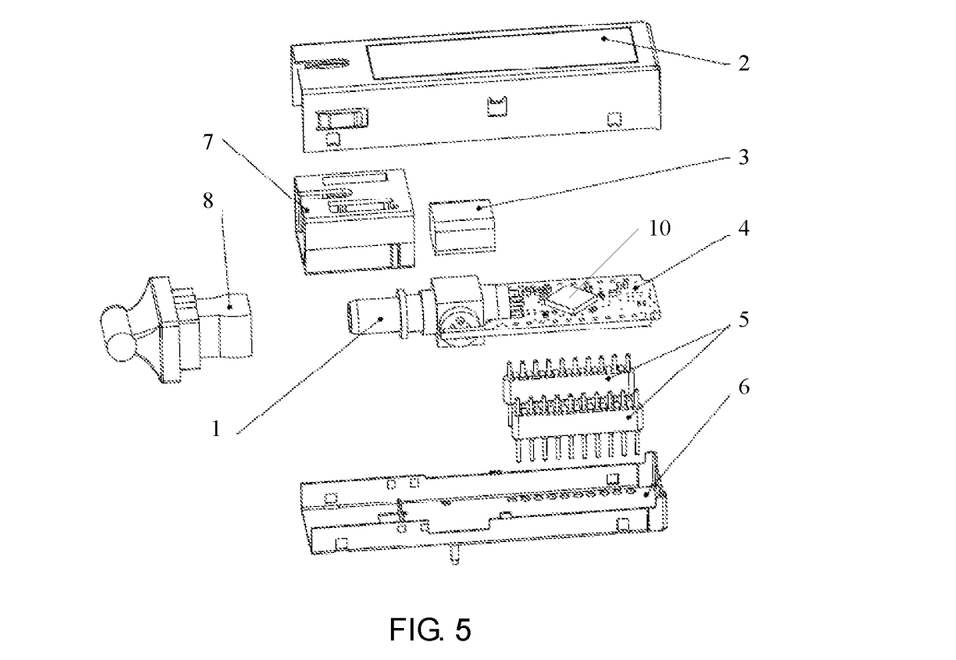
FIG. 5 is an exploded view illustrating an optical module according to some embodiments of the present application.
Figure 6:
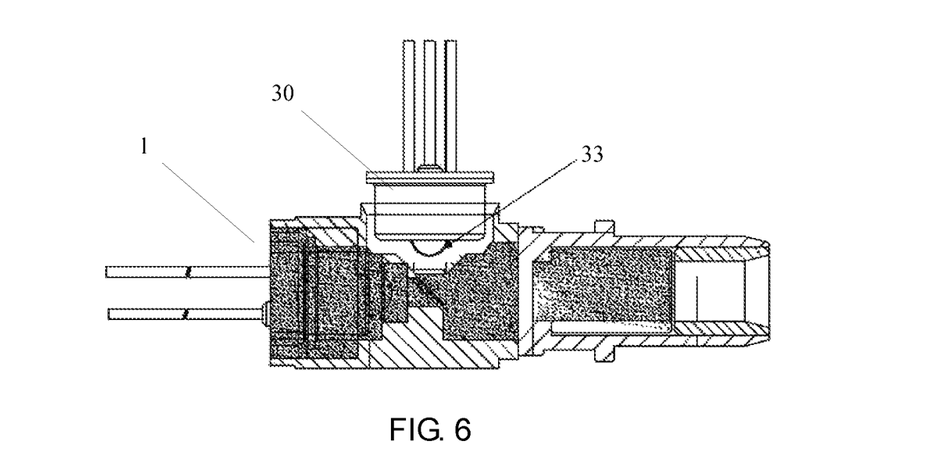
FIG. 6 is a schematic structural diagram of a BOSA of FIG. 5.

FIG. 4 is a perspective view illustrating an optical module according to some embodiments of the present application, and FIG. 5 is an exploded view illustrating an optical module according to some embodiments of the present application. Additionally, some embodiments of the present application are described by taking a laser transmitter 20 and a laser receiver 30 being encapsulated in a BOSA 1 as an example. FIG. 6 is a schematic structural diagram of a BOSA of FIG. 5. On the basis of the above embodiment shown in FIG. 1, as shown in FIG. 5, in an optical module according to some embodiments of the present application, a conductive gasket 3 is provided between a laser receiver 30 (which is contained in a BOSA 1) and a housing 2 of the optical module.

The conductive gasket 3 may be conductive foam or conductive rubber etc., and be provided between the laser receiver 30 of the BOSA 1 and the housing 2 (i.e. between the BOSA 1 and the housing 2 shown in FIG. 4), so that the laser receiver 30 is sufficiently in touch with the housing 2 so as to shorten the length of a ground loop, maintain a stable ground level reference, avoid introducing a ground noise which will interfere with a received high-frequency signal, thereby further improving sensitivity.

In some embodiments of the present application, the master control chip 10 is provided on a printed circuit board (PCB) 4 of the optical module, the PCB 4 being electrically connected to the laser transmitter 20 and the laser receiver 30.

In some embodiments of the present application, the optical module may be of a pluggable structure or a pigtail structure. In some embodiments of the present application, the optical module is described by taking a pluggable structure as an example. The PCB may be a two-layer board, a four-layer board or a six-layer board, etc.

If the optical module is of a pluggable structure, the PCB 4 may be designed as a four-layer board to lower cost. For impedance matching, a complete ground plane can be provided on the second layer to minimize the length of the ground loop, so as to improve the capacity of resisting interference and reduce radiation.

If the optical module is of a pigtail structure, the PCB 4 may be designed as a two-layer board to lower the cost. For impedance matching, a high rate signal line for signal reception may be copper-plated on both its upper and lower sides, and a ground plane may be laid to include evenly distributed vias so as to minimize the length of the ground loop, which helps improving the capacity of resisting interference and reducing radiation.

In some embodiments of the present application, the optical module further includes a pin assembly 5, a bracket 6, a claw 7, and a tail plug 8, where one end of the pin assembly 5 is welded on the PCB 4 and the other end is provided passing through the bracket 6, the laser transmitter 20 and the laser receiver 30 are fixed between the housing 2 and the bracket 6 by the claw 7, and one end of the tail plug 8 is provided within the claw 7.

The pin assembly 5 may include 20 PINS, with one end welded on the PCB 4, and the other end passing through the bracket 6 to connect to a main board to allow for signal transmission.

One end of the BOSA 1 is welded on the PCB 4 and the other end is fixed in the claw 7 which is clamped between the housing 2 and the bracket 6, so as to fix the BOSA 1 within a tube formed by the housing 2 and the bracket 6.

The outward facing end of the claw 7 is plugged by the tail plug 8 to ward off dust.

In an optical module according to some embodiments of the present application, a conductive gasket is provided between a laser receiver and a housing so as to enable the laser receiver to be sufficiently in touch with the housing, thereby shortening the length of a ground loop and improving sensitivity.

Finally, it should be noted that the foregoing embodiments are merely intended for describing the technical solutions of the present application rather than limiting the present application. Although the present application is described with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present application.

What is claimed is:

1. An optical module, comprising: a master control chip and a laser receiver, the laser receiver being connected to the master control chip, wherein the laser receiver comprises a PIN photodiode, a trans-impedance amplifier, a lens and a shell, the PIN photodiode being electrically connected to the trans-impedance amplifier, and the lens being coated with an antireflection film;

wherein the optical module further comprises: a printed circuit board (PCB) on which the master control chip is provided, wherein the PCB is electrically connected to the laser receiver; and wherein the optical module further comprises: a pin assembly, a bracket and a claw, wherein one end of the pin assembly is welded on the PCB and the other end is provided passing through the bracket, the laser receiver is fixed between a housing of the optical module and the bracket by the claw.

2. The optical module according to claim 1, further comprising: a laser transmitter, the laser transmitter is connected to the master control chip.

3. The optical module according to claim 2, wherein the laser transmitter is encapsulated in a transmitter optical subassembly (TOSA) and the laser receiver is encapsulated in a receiver optical subassembly (ROSA).

4. The optical module according to claim 2, wherein the laser transmitter and the laser receiver are encapsulated in a bi-directional optical sub-assembly (BOSA).

5. The optical module according to claim 1, wherein the PIN photodiode, the trans-impedance amplifier and the lens are encapsulated within the shell in a manner of transistor out-line.

6. The optical module according to claim 1, wherein a conductive gasket is provided between the laser receiver and the housing for making the laser receiver be in touch with the housing electrically.

7. The optical module according to claim 6, wherein the conductive gasket comprises conductive foam or conductive rubber.

8. The optical module according to claim 1, wherein the optical module is of a pluggable structure, and the PCB is a four-layer board.

9. The optical module according to claim 1, wherein the optical module is of a pigtail structure, and the PCB is a two-layer board.

10. The optical module according to claim 1, wherein a laser driver, a receipt signal limiting amplifier and a microcontroller are integrated in the master control chip.

11. The optical module according to claim 10, wherein a storage device is integrated in the master control chip.

12. The optical module according to claim 10, wherein the master control chip is connected to a storage device through a bus.

13. The optical module according to claim 1, wherein the trans-impedance amplifier has a transimpedance of no less than 43K ohms.

14. The optical module according to claim 13, wherein the trans-impedance amplifier has a transimpedance of 51K ohms.

15. The optical module according to claim 1, wherein the PIN photodiode has a positive pole connected to a positive pole of the trans-impedance amplifier.

16. An optical module, comprising: a master control chip and a laser receiver, the laser receiver being connected to the master control chip, wherein the laser receiver comprises a PIN photodiode, a trans-impedance amplifier, a lens and a shell, the PIN photodiode being electrically connected to the trans-impedance amplifier, and the lens being coated with an antireflection film;

wherein the optical module further comprises: a tail plug, a bracket and a claw, wherein the laser receiver is fixed between a housing of the optical module and the bracket by the claw, one end of the tail plug is provided within the claw.

17. An optical module, comprising: a master control chip and a laser receiver, the laser receiver being connected to the master control chip, wherein the laser receiver comprises a PIN photodiode, a trans-impedance amplifier, a lens and a shell, the PIN photodiode being electrically connected to the trans-impedance amplifier, and the lens being coated with an antireflection film;

wherein the optical module further comprises a pin assembly, a bracket and a claw, wherein one end of the pin assembly is electrically connected to the laser receiver and the other end is provided passing through the bracket.

18. The optical module according to claim 17, further comprising: a printed circuit board (PCB) on which the master control chip is provided, wherein the PCB is electrically connected to the laser receiver, and the one end of the pin assembly is welded on the PCB.

* * * * *